United States Patent [19]

Ball

[11] 3,921,480

[45] Nov. 25, 1975

[54] FORM GENERATOR FOR CELLULAR MATERIALS

[75] Inventor: Charles W. Ball, Spring Valley, Calif.

[73] Assignee: Rohr Industries, Inc., Chula Vista, Calif.

[22] Filed: Sept. 12, 1974

[21] Appl. No.: 505,465

[52] U.S. Cl. ............................ 83/1; 83/171; 83/591
[51] Int. Cl.² ............................................ B26F 3/12
[58] Field of Search ........... 83/16, 171, 1, 591, 596, 83/663; 90/15 A, 12 R

[56] References Cited
UNITED STATES PATENTS

| | | | |
|---|---|---|---|
| 2,749,608 | 6/1956 | Siemer | 83/171 X |
| 2,957,065 | 10/1960 | Bundegaard et al. | 83/171 X |
| 3,459,083 | 8/1969 | Bennis | 83/171 |
| 3,610,078 | 10/1971 | Rowlands | 83/171 X |
| 3,757,617 | 9/1973 | Fabbri | 83/171 X |

*Primary Examiner*—Frank T. Yost
*Attorney, Agent, or Firm*—Patrick J. Schlesinger; Frank D. Gilliam

[57] ABSTRACT

A form generator for cellular materials utilizes a hot wire which is suspended from a wooden form that is cut out generally to the shape desired. The wire has a series of loops by which it is attached to the interior wall of the opening in the wooden wire support. A support, by means of a pair of parallel cantilever beams, is attached or journaled on a shaft which is bracketed to a table. The cellular material is placed on the table and secured in place and the support is rotated about the shaft. As it rotates, the wire burns a surface along the material identical to that shape assumed by the wire. A roller is connected to the lower edge of the wire support to permit the support to rotate about the axis of the shaft.

6 Claims, 7 Drawing Figures

FORM GENERATOR FOR CELLULAR MATERIALS

BACKGROUND OF THE INVENTION

The present invention relates to a form generator for cellular materials such as polystyrene.

Polystyrene and associated cellular materials have been finding widespread use in many diverse fields as a structural material. For instance, the material is used in panels for surface transport vehicles such as buses, it is also utilized in the manufacture of furniture, and more recently in various applications in the aircraft industry. The material is light but rigid enough so that it may be utilized in high stress areas such as the wings, if it is incorporated with a rigid outer skin such as acrylic.

This material, while extremely utilitarian, presents some curious problems regarding the fabrication or forming of the various parts, particularly those which require a fairly high degree of dimensional accuracy. For example, the material is not suitable to be held in a vice, and as a general rule conventional metal or wood cutting procedures are not adequate. The present invention utilizes the principle that the material is easily pierced by a hot instrument such as a wire. Passing the wire over the material permits a surface to be generated. The present invention is directed to the task of generating surfaces on the material, thereby rendering it applicable for use on various small and light aircraft. A wire which is the forming tool is shaped in a contour that will approximate the preferred aerodynamic profile.

SUMMARY OF THE INVENTION

A form generator for cellular materials utilizes a hot wire which is suspended from a wooden form that is cut out generally to the shape desired. The wire has a series of loops by which it is attached to the interior wall of the opening in the wooden wire support. A support, by means of a pair of parallel cantilever beams, is attached or journaled on a shaft which is bracketed to a table. The cellular material is placed on the table and secured in place and the support is rotated about the shaft. As it rotates, the wire burns a surface along the material identical to that shape assumed by the wire. A roller is connected to the lower edge of the wire support to permit the support to rotate about the axis of the shaft.

The above and other objects of the present invention will be apparent as the description continues and when read in conjunction with the appended drawings of which:

FIG. 4b is the product produced by the cutter of FIG. 4a.

FIG. 5b is the product produced by the cutter of FIG. 5a.

DETAILED DESCRIPTION OF THE INVENTION

Figure 1:
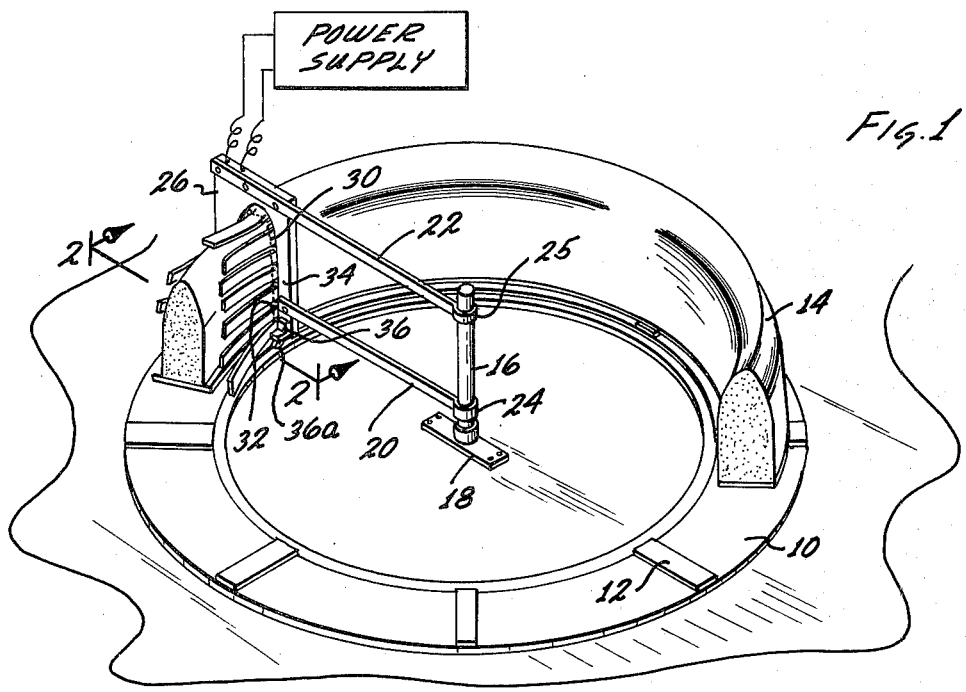
FIG. 1 is a perspective view of the apparatus embodying the instant invention showing the material being subjected to a final cut.
Figure 2:
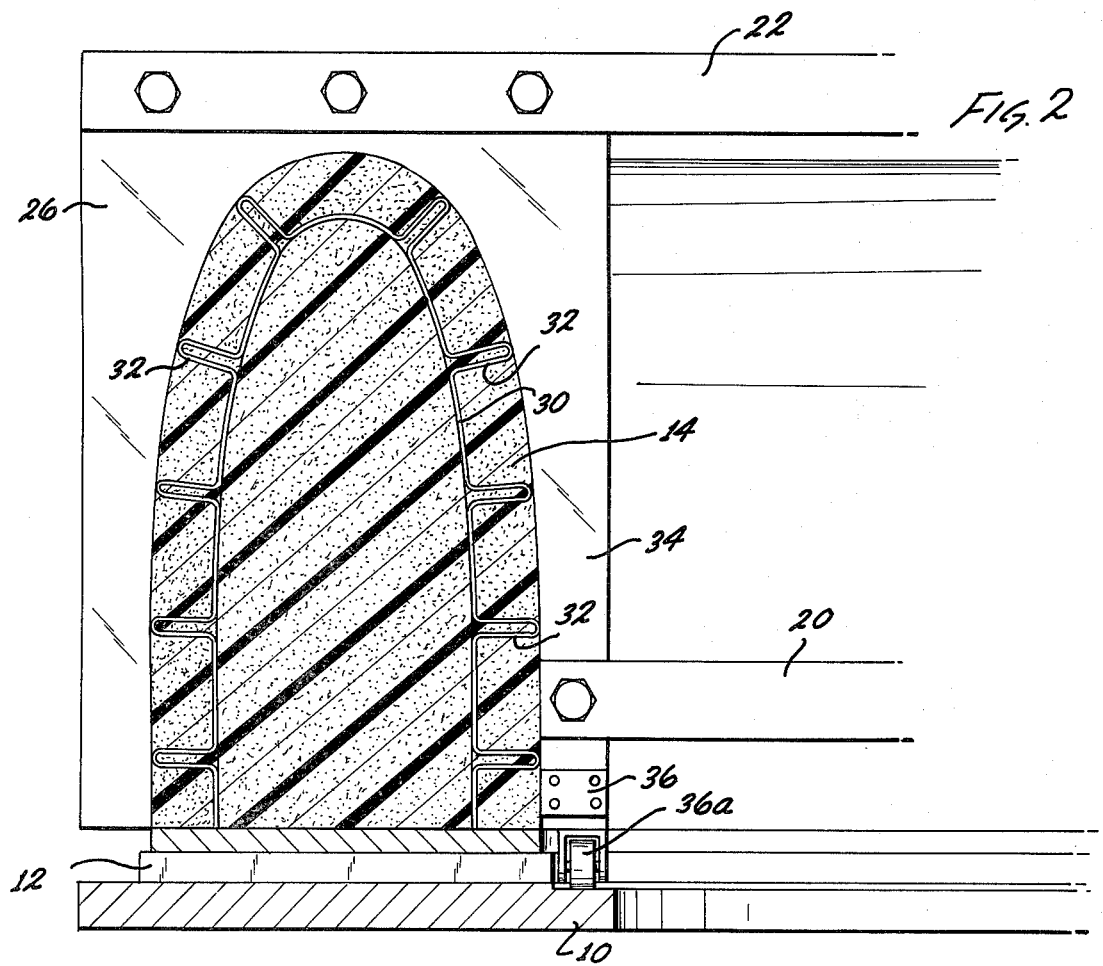
FIG. 2 illustrates an enlarged isolation view of the wire cutter.

According to FIG. 1, the present invention comprises a support or table 10 on which is spaced a series of risers 12. Those risers serve to elevate the blank of material 14 above the table surface so as to facilitate movement of the cutting apparatus.

The cutting apparatus comprises a shaft 16 which is stationary in the bracket 18, that bracket being affixed to the table 10 via a series of screws or other similar connectors. A pair of parallel cantilever arms 22, denoting the upper or long one, and 20, denoting the lower or short one, include sockets 24, 25 into which shaft 16 is journaled. There is sufficient clearance between the sockets and the shaft to permit the virtually unresisted rotation of cantilever arms about the shaft 16. Before proceeding further, it should be evident, that rather than having a stationary shaft and cantilever beams that rotate thereabout, the present invention could utilized a pivotable shaft and cantilever beams that pivot as a unit about a pivot in bracket 18.

At the outer extremities of the cantilever arms is affixed a cutting tool supporter 26. The upper cantilever arm 22 is affixed to the supporter 26 along the upper edge thereof and in effect that arm spans the entire width of the supporter 26. The lower or short cantilever arm is similarly affixed to the supporter 26, however that connection is entirely in the vicinity of the inside edge thereof. The manner of connecting the cantilever arms to the supporter 26 may be any convenient method of attachment, however, since various cutting wires must be utilized to generate a particular shape, the supporter 26 must be readily removable from the cantilever arms 20, 22. Consequently, ordinary clamps or the like have been found very convenient since they permit the supporter 26 to be removed at will.

Figure 3:
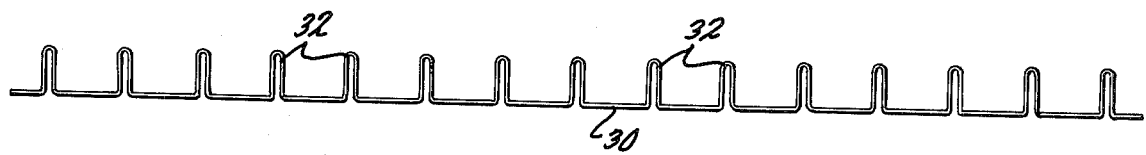
FIG. 3 is an isolated view of the configuration of the wire utilized in the present invention.
Figure 4A:
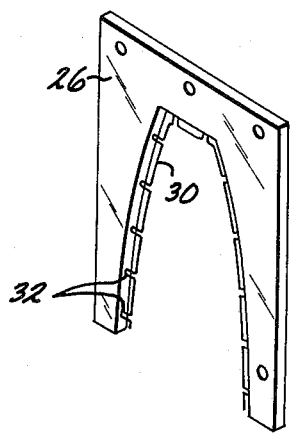
FIG. 4a is an alternate embodiment of a wire cutter.
Figure 5A:
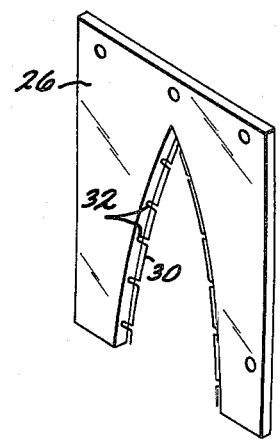
FIG. 5a is another alternate embodiment form and cutter.
Figure 4B:
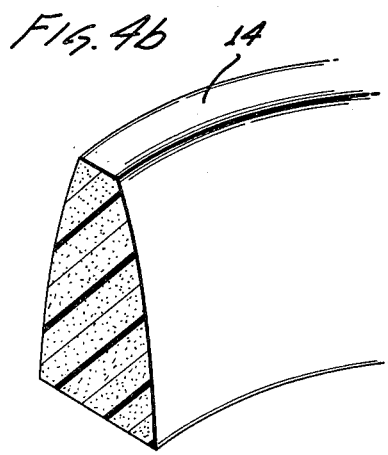
Figure 5B:
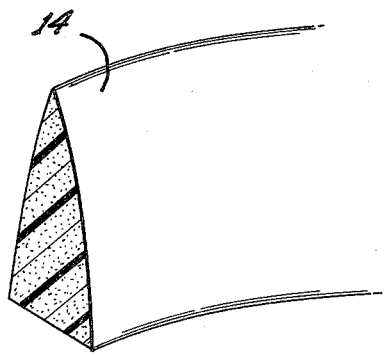

The support 26 should be constructed of a readily formable material such as wood or plastic. By readily formable, it is implied that a simple table saw can be used to cut the desired opening. The opening formed in the supporter 26 should be of a slightly greater dimension than that desired for the article 14. This permits the wire cutter 30 to be suspended from the inner wall of the supporter 26. That wire cutter is preferably a nicron wire and it has been found that a diameter of 0.040 is particularly convenient for these purposes. As shown in FIG. 3, the wire is provided with a series of loops 32, which loops are connected to the inner walls of the openings in the supporter 26. In this fashion, the hot wire 30 is offset from the inner walls and is in effect suspended within the opening. The blank of material 14 is placed on the table, it is elevated by the risers, and it is held in place as the cutter is rotated about the shaft 16. As the cutter is rotated, a current is passed therethrough, which heats the wire sufficiently to easily pierce through the material 14. As the cutter passes through the material, it burns away the excess and what remains along the trailing side of its path is the desired contour of the polystyrene material. The apparatus disclosed in the various figures of the drawing indicates that it is particularly useful where all surfaces being generated are of a radial nature. However, it should be easily conceived that the principles of the instant invention are adaptable to generating non-radial cuts in that the shaft 16 can be replaced by a cam follower, and it can be guided along a cam which is shaped so as to provide the desired contour or profile of the finished part.

Upon cutting through the material, the excess is merely shredded from the material blank and falls away.

A roller 36 is affixed to the inside leg 34 of the supporter 26 by means of a bracket 38. That roller may be adjusted in height by means of a set screw. By a simple adjustment of the set screw, the roller can be positioned at any desired height which in turn positions the supporter and consequently the wire cutter at any particular height. The form generated by the wire cutters may be further machined by other apparatus where a high degree of dimensional tolerance is desired, however, in many instances, the wire can be contoured to produce a part which conforms dimensionally to that required.

It should be evident, that the apparatus herein described may be utilized to form semi-structural materials other than polystyrene, but which are readily pierced by a hot cutter. Radial shapes are conveniently generated with the apparatus and with slight modifications, non-radial shapes are formable utilizing the same principles as incorporated in the instant invention. The number of cuts utilized in producing the the article of desired dimensionality is a function of the complexity of the configuration of the finished article. Since the supporters are easily formed and the hot wire cutters are readily attachable to the supporters, there is little difficulty involved in producing even the most complex contour or profile.

Many changes may be made in details of the instant invention, in the method and materials of fabrication, in the configuration and assemblage of the constituent elements, without departing from the spirit and scope of the appended claims, which changes are intended to be embraced therewithin:

I claim:

1. Form generator for cellular materials which comprises shaft means connected to a table, form means connected to said shaft means and adapted for pivotal movement about said shaft means, said form means having formed therein an opening of a contour designed to produce a part of the desired profile, and cutting means employed in said opening and similar in shape to said opening, said cutting means active on a blank of said cellular material to reduce it to the desired shape.

2. In the form generator of claim 1, said cutting means is a current carrying wire which is heated to a temperature which will cut the cellular material.

3. In the form generator of claim 1, said wire includes a series of loops by which said wire is fastened to said form means and which loops offset inwardly the cutting surfaces of said wire from the inner walls of said form means.

4. In the form generator of claim 1, said form means is connected to said shaft by means of a cantilever arm pivotally connected to said shaft means.

5. In the form generator of claim 1, roller means connected to said form means and extending from the lower part thereof and spaces said form means from said table.

6. In the form generator of claim 4, said form means are removable from said cantilever arm.

* * * * *